United States Patent [19]

Mills

[11] Patent Number: 5,055,761
[45] Date of Patent: Oct. 8, 1991

[54] SMOOTH ROTATION BY A GALVANOMETER

[75] Inventor: James L. Mills, Reno, Nev.

[73] Assignee: Linear Instruments, Reno, Nev.

[21] Appl. No.: 313,647

[22] Filed: Feb. 21, 1989

[51] Int. Cl.$^5$ .............................................. H02P 8/00
[52] U.S. Cl. .................... 318/696; 318/685; 318/615; 318/561; 318/564; 356/319
[58] Field of Search ............... 318/696, 685, 615, 561, 318/564; 356/319

[56] References Cited

U.S. PATENT DOCUMENTS

| | | | |
|---|---|---|---|
| 3,758,762 | 9/1973 | Littman et al. | 318/561 X |
| 4,172,990 | 10/1979 | Everett | 318/685 |
| 4,533,991 | 8/1985 | Georgis | 364/164 |
| 4,603,286 | 7/1986 | Sakano | 318/615 |
| 4,669,878 | 6/1987 | Meier | 356/319 |
| 4,706,003 | 11/1987 | Nakashima et al. | 318/568 |

OTHER PUBLICATIONS

Machinery Handbook, pp. 586–591, 1988.

Primary Examiner—William M. Shoop, Jr.
Assistant Examiner—Saul M. Bergmann
Attorney, Agent, or Firm—Skjerven, Morrill, MacPherson, Franklin & Friel

[57] ABSTRACT

A method and device for smoothly rotating a diffraction grating in a spectrophotometer by means of a galvanometer includes modifications in the software in the microprocessor which controls the galvanometer. The software modifications cause the galvanometer to rotate the grating in a series of discrete steps that stimulate a smooth minimum jerk rotation. The amount of rotation in each discrete step is calculated by the microprocessor.

15 Claims, 9 Drawing Sheets

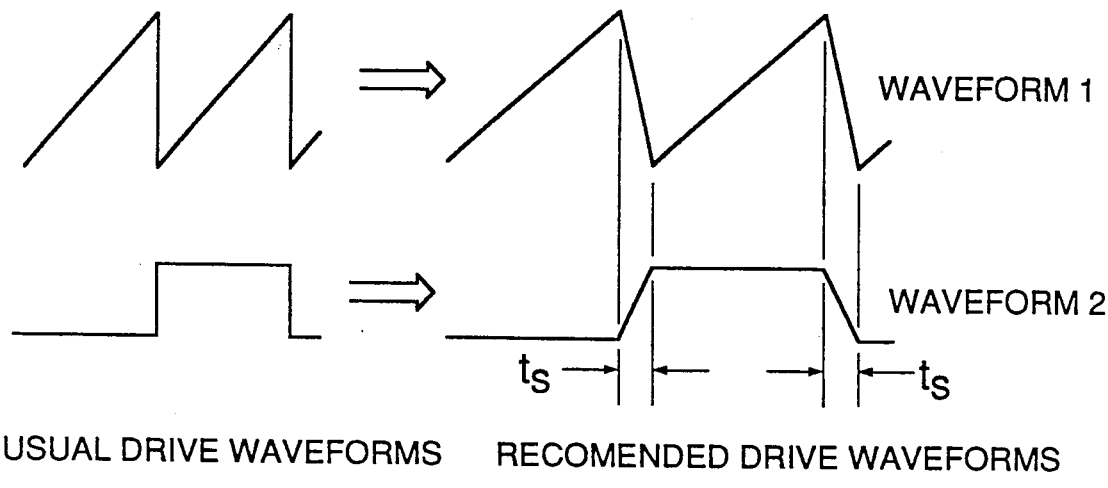
USUAL DRIVE WAVEFORMS   RECOMENDED DRIVE WAVEFORMS
Fig. 2A
(Prior Art)
Fig. 2B
(Prior Art)
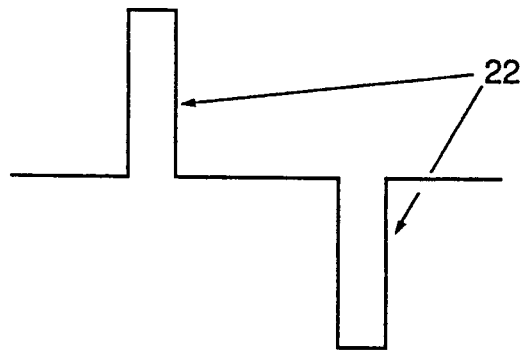
Fig. 2C
(Prior Art)
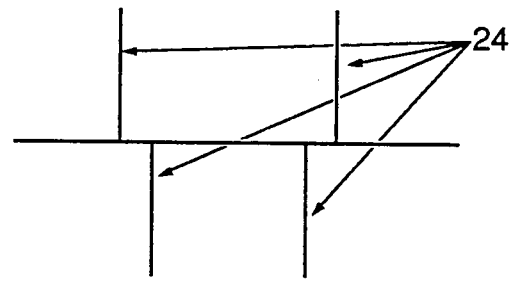

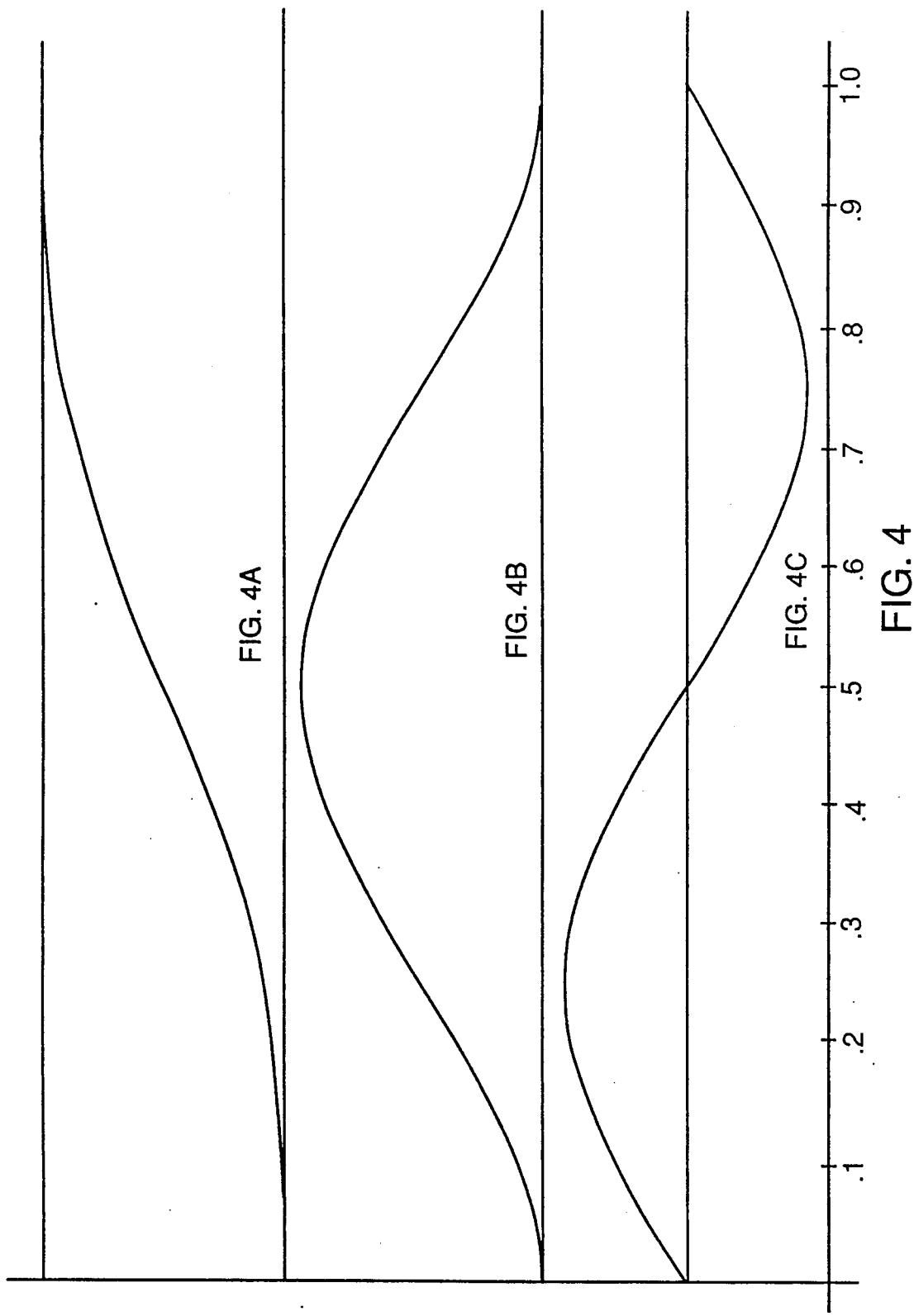

KEY TO
FIGURE 6A

| FIG. 6A' |
| FIG. 6A" |
| FIG. 6A'" |

```
$CHIP=6803

;           RAM

DESTL:  DS      2       ; DESTINATION D/A VALUE
DCNT:   DS      2       ; DELAY COUNT (IDLE TIME
;                         PER LOOP) INITIAL VALUE
CURL:   DS      2       ; CURRENT D/A VALUE
GCNT:   DS      2       ; COUNT (POINTER
;                         ADVANCE, ACTUALLY) OF
;                         GALVO CURVE, INDEXES
;                         LOCATION IN JCURV TABLE
PROD:   DS      2       ; MULTIPLY PRODUCT
CSIN:   DS      1       ; SIGN OF GRATING
;                         MOVEMENT (+ = HIGHER
;                         D/A DEST)
DIF:    DS      2       ; MAGNITUDE OF
;                         DIFFERENCE BETWEEN
;                         SOURCE AND DESTINATION
;                         D/A VALUES

;           ROM

;       JERKLESS CURVE ROUTINE
;       INPUT:
;               DESTINATION D/A VALUE: DESTD
;               DELAY COUNT: DCNT
;               CURRENT D/A VALUE: CURL
```

FIGURE 6A'

```
CURVE:    CLR     CSIN
          LDD     DESTD
          SUBD    CURL
          BPL     S3
          STAA    CSIN
          NEGB                ; NEGATE D (NOTE THAT THE
                                NEG INSTRUCTION CLEARS
                                CARRY IFF RESULT = 0)
          ADCA    #0
          NEGA

S3:       ASLD                ; MULTIPLY BY 2 BECAUSE
;                               JCURV PROCESS DIVIDES BY
;                               2
          STD     DIF
          LDX     #JCURV
          STX     GCNT

;    START OF THE LOOP
LOOP:     LDAA    DIF         ; MULTIPLY DIF
;                               (DIFFERENCE BETWEEN
;                               PREVIOUS AND
;                               DESTINATION
          LDAB    1,X         ; D/A VALUES) BY JCURV
;                               LOOK UP TABLE VALUE
;                               (VARIES
          MUL                 ; SMOOTHLY (JERKLESSLY)
;                               FROM 0 TO .5)
          ADCA    #0
          TAB
          CLRA
          STD     PROD
          LDAA    DIF+1
          LDAB    0,X
          MUL
          ADCA    #0
          TAB
```

FIGURE 6A"

```
CLRA
         ADDD    PROD
         STD     PROD
                 LDAA    DIF
         LDAB    0,X
         MUL
         ADDD    PROD
         TST     CSIN    ; NEGATE IF NESESSARY
         BPL     L1
         NEGB
         ADCA    #0
         NEGA
         BRA     L2
L1:      NOP             ; SAME EXECUTION TIME IF
;                          POSITIVE
         NOP
         NOP
         BRN     L1
```

FIGURE 6A'''

| | | | |
|---|---|---|---|
| L2: | ADDD | CURL | ; VALUE OUT TO D/A |
| | JSR | DAO | |
| L6: | LDX | DCNT | ; IDLE TIME LOOP (TO PROVIDE EASY VARIATION IN JERKLESS CURVE |
| ; | | | |
| ; | | | |
| | BEQ | L8 | ; SPEED, FOR EXPERIMENTATION, IF |
| ; | | | |
| ; | | | DESIRED) |
| L7: | DEX | | |
| | BNE | L7 | |
| L8: | LDX | GCNT | ; DONE WITH CURVE? |
| | CPX | #JCE | |
| | BEQ | L9 | ; YES |
| | INX | | ; NO |
| | INX | | |
| | STX | GCNT | |
| | JMP | LOOP | |
| L9: | LDD | DESTL | |
| | STD | CURL | |
| | RTS | | ; END OF ROUTINE |

; D/A OUT ROUTINE

| | | | |
|---|---|---|---|
| DAO: | STAB | $4800 | ; GALVO DRIVE D/A |
| | STAA | $5000 | |
| | STAA | $5800 | |
| | RTS | | |

; 50 POINT CURVE

| | | |
|---|---|---|
| JCURV | DW | 2,14,46,109,211,362,569,840 |
| | DW | 1179,1594,2086,2659,3315,4052 |
| | DW | 4870,5767,6738,7778,8882 |
| | DW | 10042,11250,12498,13776,15075 |
| | DW | 16384,17693,18992,20270,21518 |
| | DW | 22726,23886,24990,26030,27001 |
| | DW | 27898,28716,29453,30109,30682 |
| | DW | 31174,31589,31928,32199,32406 |
| | DW | 32557,32659,32722,32754,32766 |
| JCE: | DW | 32768 |

FIGURE 6B

SMOOTH ROTATION BY A GALVANOMETER

BACKGROUND OF INVENTION

1. Field of the Invention

This invention relates from a smooth rotation of an object by an electric drive motor to a desired position. More specifically, the invention relates to control of a galvanometer used to rotate a diffraction grating in a spectrophotometer.

2. Description of the Prior Art

A typical prior art system for rotating an object, such as a diffraction grating in a spectrophotometer, is shown in FIG. 1. The purpose of the system 10 is to rotate the diffraction grating 11 to a precise angular position so that the grating 11 diffracts incident light which is coming from a source (not shown) to a destination (not shown). The grating 11 must be at a precise angle so that the light diffracted to the source is at a predetermined wavelength. The grating 11 is rotated to various positions by the system so as to diffract various wavelengths. It is important that the grating 11 be quickly rotated to each of its positions, so that the spectrophotometer can utilize in quick succession the various diffracted wavelengths.

The prior art system 10 is a standard analog feedback servo system. A position sensor 12 attached to galvanometer 13 provides a signal proportional to the angular position of output shaft 14 of galvanometer 13 to which grating 11 is attached. The conventional microprocessor 15 (typically an 8 bit microcontroller) provides commands by means of a digital to analog converter 16 to rotate the output shaft 14 of galvanometer 13 to a desired position. The position sensor 12 output is subtracted from the input commands and the resultant "error" signal 17 drives a conventional closed loop control circuit 18, including lead and lag networks, which in turn drive the galvanometer output shaft 14 to the desired position.

A major deficiency of this prior art system is that at high gain, the galvanometer 13 does not respond well to discontinuous input commands, e.g., step functions. Typical responses by the galvanometer 13 to a step include overshoot, which is detrimental to the galvanometer if the swing takes the galvanometer output shaft rotation past the specified limits, and exacerbation of resonances of modes outside of the angular rotation, such as a decaying resonance of the grating about the axis perpendicular to the axis of rotation and parallel to the grating surface.

The rotation of the grating 11 produced typically by the prior art system 10 of FIG. 1 is shown in FIGS. 2A, 2B and 2C. FIG. 2A shows the angular position (vertical axis) versus time (horizontal axis) of the grating 11 of FIG. 1. FIG. 2B shows the velocity (i.e., first derivative of position with respect to time) of the grating versus time. The abrupt "step" 22 is apparent. FIG. 2C shows the acceleration (i.e., second derivative of position with respect to time) of the grating versus time. The abrupt impulses 24 in acceleration are apparent, meaning that the grating 11 of FIG. 1 is "jerked" by a sudden acceleration and again by a sudden deceleration. This jerking is the cause of the aforementioned overshoot and resonances.

One prior art approach to the problem is to electronically filter the commands output by microprocessor 15 (see FIG. 1) so as to smooth out the commands to the galvanometer 13. However, this approach does not eliminate the jerking because typically the velocity of rotation still changes very abruptly, since the velocity achieves maximum value typically in much less than one time constant of the filter, so that resonance (i.e., ringing) still occurs. Also, a filter used for such purposes takes a long time period to settle to its final output level; this long time period slows the overall response of the system.

SUMMARY OF THE INVENTION

In accordance with the present invention, a method and device are provided to improve the performance of a conventional galvanometer (or other electric motor drive) which rotates an object such as a diffraction grating, where the object is smooth and accurate rotation of the object to a desired position.

The method of the present invention in the preferred embodiment includes modifications to the software in the conventional microprocessor that issues commands to the galvanometer. In accordance with the preferred embodiment, the microprocessor issues commands (i.e., signals) to the galvanometer to rotate the object in a series of discrete steps, so as to rotate the object to the desired position. The discrete steps simulate a smooth rotation in terms of the position of the object. The amount of movement in each discrete step is calculated by the microprocessor to be close to a smooth curve when the amount of rotation is plotted as a function of time.

BRIEF DESCRIPTION OF THE FIGURES

FIGS. 2A, 2B, and 2C depict graphically the prior art rotation of an object.

FIGS. 4A, 4B and 4C depict the rotation of an object in accordance with the present invention.

FIGS. 6A, 6A", 6A"' and 6B show the computer program of FIG. 5 as used in the preferred embodiment of the present invention.

DETAILED DESCRIPTION OF THE INVENTION

Figure 1:
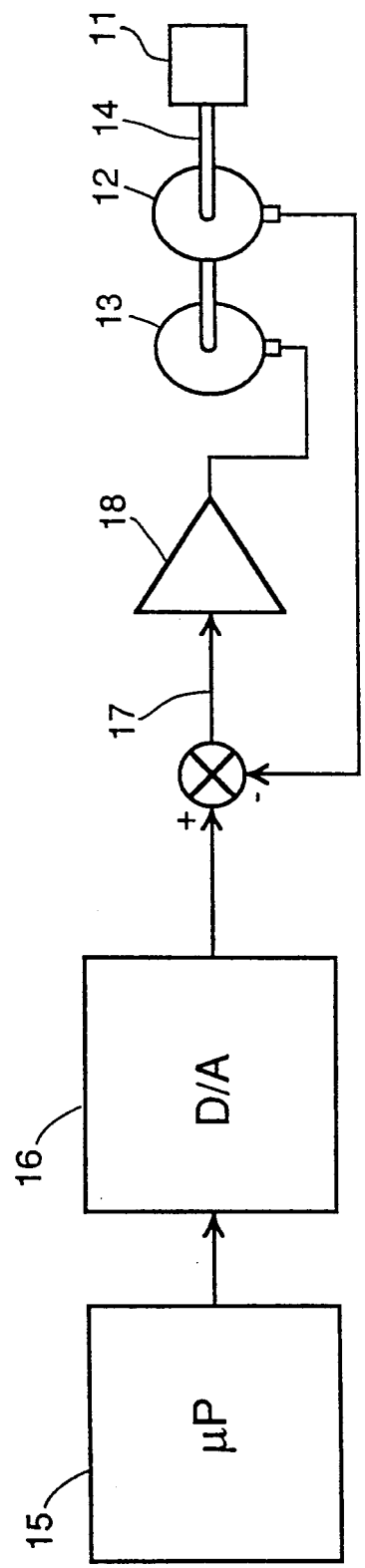
FIG. 1 depicts a prior art galvanometer servo system.
Figure 3A:
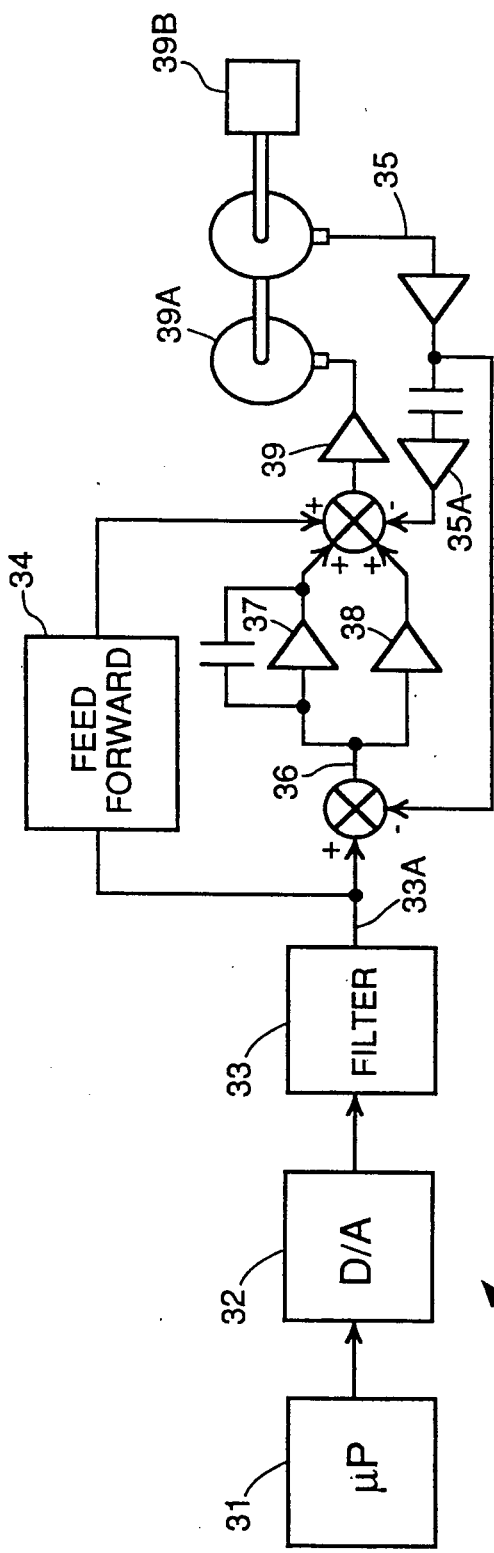
FIGS. 3A, 3B, 3C depict a servo system in accordance with the present invention.

FIG. 3A depicts a servo system 30 in accordance with the preferred embodiment of the invention.

Figure 3C:
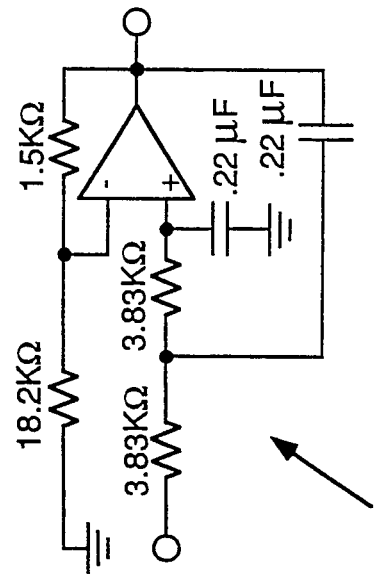

Conventional microprocessor 31 (preferably a commercially available 6803-type eight bit microcontroller) provides step commands to ultimately drive galvanometer 39A (preferably a commercially available galvanometer from General Scanning, part no. G325DT). The commands are issued from microprocessor 31 to conventional digital to analog converter 32 (preferably commercially available Analog Devices part no. AD667). The resulting analog step signals are provided to conventional two pole low pass active filter 33, which cuts off frequencies over 180 Hz. The preferred circuit of filter 33 is shown in FIG. 3C, with preferred component values as shown.

The output of the filter 33 is the command signal input 33A to a closed loop servo control circuit. The command signal is used to drive a conventional feed forward circuit 34, and is also summed with the inverse of the positional sensor output 35 to provide an error signal 36. This error signal 36 goes into a lag, or integrator amplifier 37 and a proportional amplifier 38. These two signals are summed along with the feed forward circuit 34 output and the inverse of the output of a lead, or derivative amplifier 35A connected to the positional sensor output 35, to provide a signal that is amplified by amplifier 39 and used to drive the galvanometer 39A. The purpose of the lead amplifier 35A is to provide system damping, or stability. The purpose of the feed forward circuit 34 is to quicken the response of the system. Feed forward circuit 34 does this by deriving a drive signal directly from the command input which is reasonably close to the actual signal required to drive the galvanometer 39A to the desired position. Without the feed forward circuit 34 the system 30 reacts to a command input only as the error signal becomes nonzero. Hence, the feed forward circuit 34 provides an anticipatory feature to the system 30. The feed forward circuit 34 consists of conventional proportional and derivative amplifiers with their outputs summed together.

Figure 3B:
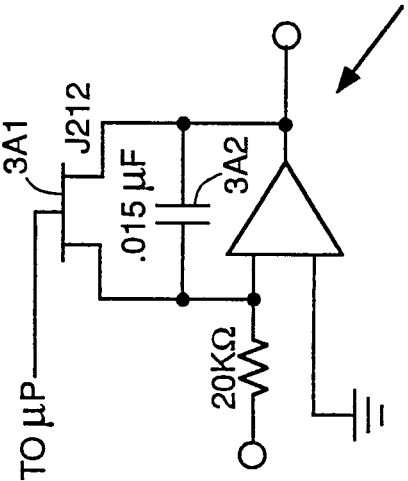

Details of the integrator 37 including an integrator cutout feature are shown in FIG. 3B, together with preferred component values. When the grating 39B is stationary, the integrator cutout FET (field effect transistor) switch 3A1 is kept open, allowing the capacitor 3A2 to acquire charge, which has the effect of reducing the error signal 36 to zero, in accordance with conventional servo control theory. During grating 39B movement, however, if the switch 3A1 is left open, the capacitor 3A2 accumulates a charge that bears no relation to that charge required to maintain a zero error at the new position, and is typically far larger. The wait for the circuit to dissipate this charge slows down the response of the system 30. The integration cutout switch 3A1 is closed by the microprocessor 31 during the period of the smooth rotation and opened only when the command signal is a stationary signal.

The system 30 as shown in FIG. 3A includes, preferably installed in microprocessor 31, software (not shown) that generates the commands provided ultimately to the galvanometer 39A. The software computes a series of discrete commands to move a step that simulate the minimum jerk curve (i.e., smooth) rotation of grating 39B.

The microprocessor 31 computes by means of this software the value for each step by the equation:

$$Y = Y_p + (Y_n - Y_p) * J_n$$

where:
$Y_p$ = previous grating command position;
$Y_n$ = desired grating command position;
$J_n$ = minimum jerk curve value, derived from a lookup table for each step.

$J_n$ is calculated for the lookup table as $$J_n = (n/T) - (1/(2*\pi)) * \sin(2*\pi*n/T)$$

where:
n = step number;
T = total number of steps.

"Grating command position" is a number that linearly corresponds to a given grating position.

FIG. 4A shows the angular position (vertical axis) versus time (horizontal axis) of the grating 39B of FIG. 3A as rotated in accordance with the present invention. The smoothness of the movement is apparent compared to that shown in corresponding prior art FIG. 2A. FIG. 4B shows the velocity of the grating 39B versus time; again, the velocity curve is smooth compared to that of corresponding prior art FIG. 2B. FIG. 4C shows the acceleration of the grating 39B versus time; the acceleration is also smooth compared to that of corresponding prior art FIG. 2C as seen in FIG. 4C the angular acceleration is proportional to a sine function of time, as are angular position and angular velocity in FIGS 4A and 4B respectively.

Thus FIGS. 4A, 4B and 4C show how the grating 39B (or any other object) is rotated smoothly in accordance with the present invention, so eliminating the problems caused by jerking in the prior art.

Figure 5:
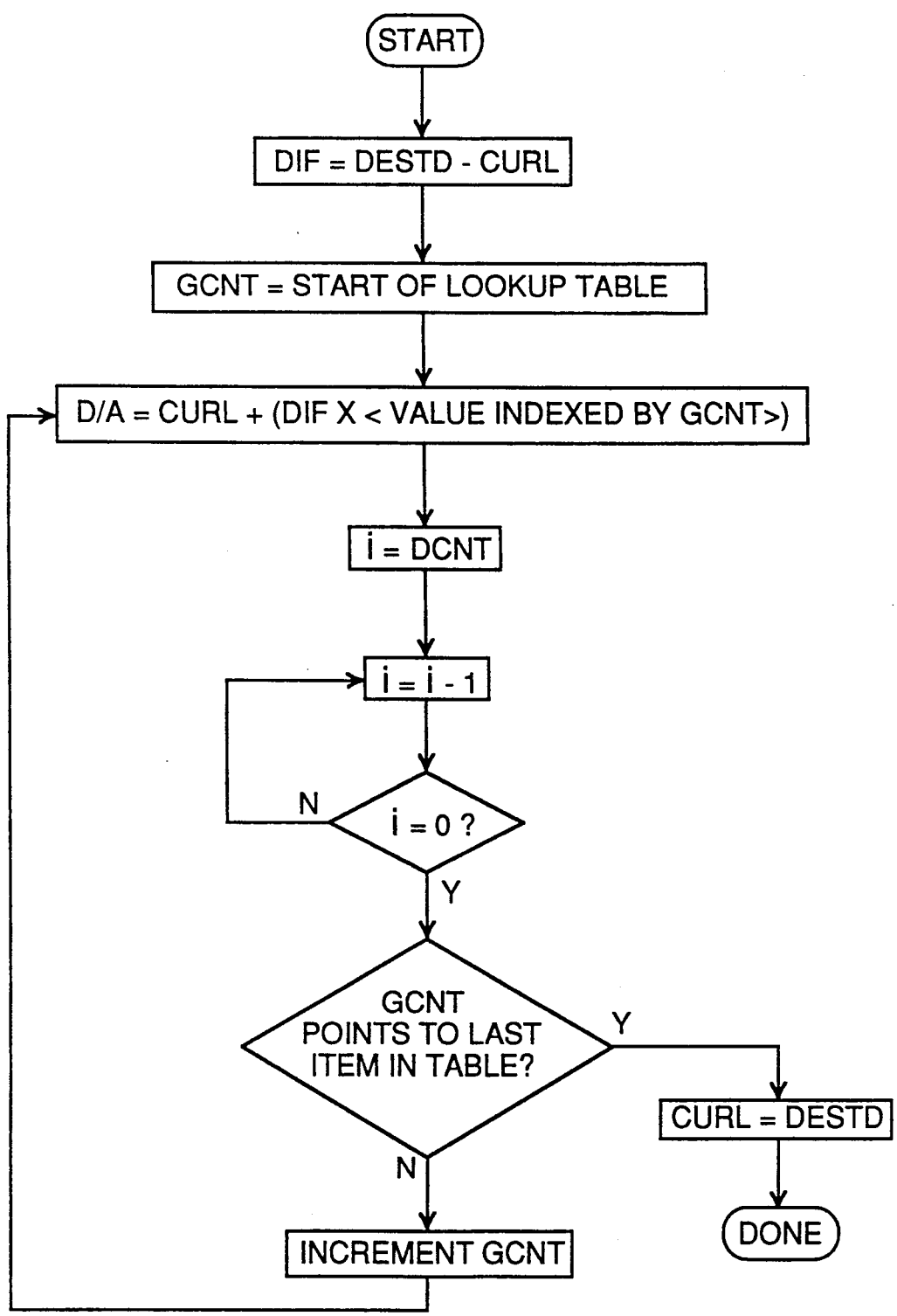
FIG. 5 depicts in flow chart form a computer program in accordance with the preferred embodiment of the present invention.

FIG. 5 depicts in flowchart form the preferred embodiment of the computer software as used in microprocessor 31 of FIG. 3A. The assembly language software as used in the preferred embodiment of the invention is shown in FIGS. 6A and 6B.

In a second embodiment of the invention, filter 33 (see FIG. 3A) is dispensed with. The feed forward 34 of FIG. 3A is also dispensed with in yet another embodiment. Similarly, the integrator 37 cutout switch 3A1 (see FIG. 3B) of the preferred embodiment is omitted in another embodiment.

The above description of the invention is illustrative and not limiting; other embodiments will be apparent to those skilled in the art in light of the teachings of the invention.

I claim:

1. A method for smoothly rotating an object to a desired position by use of an electric motor, comprising the steps of:
    calculating a series of discrete step signals simulating a smooth rotation of the object to the desired position by the electric motor, wherein an angular acceleration of the object is equal to a constant times a sine function of time; and
    providing the step signals to drive the electric motor.

2. The method of claim 1, wherein said step of calculating the step signals is performed by computer software.

3. The method of claim 2, wherein the computer software calculates a current step signal as a function of the previous step signal, the desired position of the object, and a smoothing factor.

4. The method of claim 3, wherein the smoothing factor is a function of a total number of step signals needed to rotate the object to the desired position, and of a number of the current step signal in the total number of step signals.

5. The method of claim 1, further comprising the step of electronically filtering the step signals before the step providing them to the electric motor.

6. The method of claim 5, wherein the step of filtering is performed by means of an active filter.

7. The method of claim 1, further comprising the step of integrating an error signal only when the object is not rotating, the error signal being a function of the step signals and of a sensor signal indicating a current position of the object.

8. A system for smoothly rotating an object to a desired position, comprising:
    motor means for rotating the object; and
    means for providing a series of discrete step signals for driving the motor means, wherein the step signals simulate a smooth rotation of the object to the desired position by the motor means, wherein an angular acceleration of the object is equal to a constant times a sine function of time.

9. The system of claim 8, wherein the motor means is a galvanometer.

10. The system of claim 8, wherein the means for providing a series of discrete step signals comprises software means for computing each step signal.

11. A system for smoothly rotating an object to a desired position comprising:
   control means for generating analog step commands to move the object;
   means for moving the object;
   a position sensor for sensing a position of the object and generating a position sensor signal therefrom;
   means for damping the signal generated by the position sensor and generating a damped position sensor signal therefrom;
   first combining means for combining the analog step commands and said position sensor signal;
   a lag amplifier and a proportional amplifier connected in parallel for each receiving the combined analog step commands and said position sensor signal; and
   second combining means for combining the damped position sensor signal, and the output signals of the lag amplifier and proportional amplifier, and providing a resultant signal to the means for moving, so as to move the object with minimum jerk.

12. The device of claim 11, further comprising a low pass filter for filtering the analog step commands which are combined with the position sensor signal.

13. The device of claim 11, further comprising a feed forward circuit for feeding forward the analog step commands, and
   wherein the second combining means also combines the fed forward analog step commands for providing the resultant signal.

14. The device of claim 11, further comprising means for bypassing the lag amplifier when the object is rotating.

15. A system for smoothly rotating an object to a desired position, comprising:
   control means for generating analog step commands to move the object;
   a filter for filtering the analog step commands;
   means for moving the object;
   a position sensor for sensing a position of the object and generating a position sensor signal therefrom;
   means for damping the signal generated by the position sensor and generating a damped position sensor signal therefrom;
   means for combining the filtered analog step commands and said position sensor signal;
   a feed forward circuit for feeding forward the filtered analog step commands;
   a lag amplifier and a proportional amplifier connected in parallel for each receiving the combined filtered analog step commands and the undamped signal from the position sensor signal; and
   means for combining the damped position sensor signal, the fed forward filtered analog step commands, and the output signals of the lag amplifier and proportional amplifier, and providing a resultant signal to the means for moving, so as to move the object with minimum jerk.

* * * * *